Patented Aug. 23, 1949

2,479,832

UNITED STATES PATENT OFFICE 2,479,832

PENICILLIN PREPARATION

Gordon A. Grant, Montreal, Quebec, Canada, assignor, by mesne assignments, to Ayerst, McKenna & Harrison Limited, New York, N. Y., a corporation of New York No Drawing. Application May 23, 1944, Serial No. 536,961. In Canada May 13, 1944

8 Claims. (Cl. 260—302)

This invention relates to the production of alkali metal salts of penicillin.

PRIOR ART

Certain salts of penicillin, such as for instance, the calcium, are open to objection, so that methods have been proposed for converting them to other salts, as for instance, the sodium. These processes have involved the use of organic solvents for extracting the penicillin as the free acid and subsequently extracting the organic solution with aqueous solutions containing buffer salts. Such processes have resulted in a marked loss of potency and in the addition of impurities to the end product.

I have now been able to convert the calcium salt of penicillin directly to the sodium salt by ion exchange, avoiding the disadvantages of the prior methods. This conversion has been effected completely in high yield, that is to say, the penicillin is not, as might be expected, lost in the process, and at the same time, the addition of impurities is avoided.

With this concept in view, the invention consists in the procedures hereinafter set forth and for the purposes related.

PREFERRED PROCEDURE

A preferred procedure according to my invention is as follows. A solution containing the calcium salt of penicillin is obtained by known methods and the potency determined by assay. The solution is treated with a synthetic resin effective to cause cation exchange, for example, "Amberlite IR—100" resin (sodium form), a commercial synthetic resin obtained by the condensation of a mixture comprising a polyhydric phenolic body and a resinogenic compound containing a labile methylene group, and containing replaceable sodium. This treatment is carried out preferably at the temperature of an ice bath, whereby the calcium ion of the original solution is removed and the sodium ion substituted therefor. The resin can either be stirred into the liquid or the liquid passed over the resin, with the latter suitably packed in a column. It is also preferable to carry out the procedure at a pH from about 6.5 to about 7.1, a range within which the penicillin salt has been found to be relatively stable. The reaction mixture is then filtered and the resin washed with water. The water is then added to the original filtrate, giving a solution of the sodium salt of penicillin in close to quantitative yield. Alternatively, the solution of the calcium salt of penicillin can be treated with the form of "Amberlite IR—100" resin, which contains replaceable hydrogen, and the penicillin then treated with an aqueous solution of an alkali metal or an alkaline earth metal compound to obtain a solution of the corresponding salt of penicillin.

The penicillin salts obtained as described herein are useful as anti-bacterial agents.

EXAMPLES

In order to explain the invention more specifically, a particular example is given as follows. It will, of course, be understood that the data given are illustrative only and not to be taken in a limiting sense.

Example 1

Penicillin was produced by growing the mould "Penicillium notatum" on a suitable nutrient broth, as for instance that described by Florey. The penicillin was isolated from the harvested broth in the form of its crude calcium salt and its antibiotic activity assayed by usual methods, for instance, the "plate" method or the "serial dilution turbidometric" method. After acidification of the cold broth the acidified broth was extracted with cold amyl acetate and the penicillin subsequently obtained as the calcium salt, by extraction of the amyl acetate with water in the presence of calcium carbonate. After filtration, this water-solution contained the calcium salt of the penicillin present in the harvested broth as determined by the usual assay for potency, that is, the inhibition of the growth of test staphylococcus organisms.

The solution of the calcium salt of penicillin was then converted directly to a solution of the sodium salt by the following procedure. The potency of about 100 cc. of the aqueous solution (pyrogen-free distilled water) containing about 5 grams of the crude calcium salt of penicillin prepared as just described, was determined by assay to comprise about 650,000 Oxford units of penicillin. This mixture was cooled in an ice bath and the pH was adjusted to about 6.5 to about 7.1 with 10% phosphoric acid. About 30 grams of "Amberlite IR—100" resin (sodium form) were added to the solution in the bath in about 10 gram portions at intervals of about 5 to about 10 minutes with stirring. The stirring was continued until the removal of the calcium ion had proceeded to substantial completion as judged by the usual chemical tests, for instance, the solution gave no further precipitate when a portion was tested with sodium carbonate or sodium oxalate solutions. The mixture was then filtered and the "Amberlite" resin precipitate washed with water, which was added to the original filtrate. This gave a solution of the sodium salt of penicillin containing over 90% of the potency of the original solution of the calcium salt, in a form suitable for subsequent clinical use after the usual filtration to ensure sterilization.

Example 2

About 250 cc. of an aqueous solution (in pyrogen-free distilled water) containing about 1.7 million units of penicillin in the form of its crude calcium salt was placed in an ice bath and adjusted to a pH from about 6.5 to about 7.1 with 10% phosphoric acid. The conversion to the sodium salt was carried out by the addition, in portions of 10 grams, of "Amberlite IR-100" resin (sodium form) with stirring.

The removal of the calcium ions from the solution was tested in the manner described in the preceding example. The resin was filtered off and washed with water and the washings added to the original filtrate. The final solution, about 354 cc. contained the sodium salt of penicillin. The potency was about 5,000 units per cc. as determined by usual methods of assay, e. g. inhibition of staphylococcus organisms. The potency was thus completely recovered in the form of the sodium salt of penicillin. This solution after adjusting the pH to between about 6.3 and about 6.5 and after filtration to render it sterile was suitable for clinical use.

*Note.*—Alternatively, the solution can be dried in vacuo from the frozen state to yield the crude dry sodium salt.

Example 3

An aqueous solution containing the calcium salt of penicillin was treated with "Amberlite IR-100" resin (hydrogen form) until the calcium ion had been removed substantially completely from the solution. The resin was filtered off and the aqueous solution containing the penicillin in the acid form was neutralized by the addition of dilute sodium hydroxide. A solution of the sodium salt of penicillin was thus obtained without appreciable loss of the original potency.

End of examples

MODIFICATIONS

The applicant has described the invention with particular reference to the conversion of the calcium salt of penicillin to the corresponding sodium salt. It will be understood that other alkaline earth or alkali metal salts of penicillin may be converted by the procedure described to other suitable alkaline earth or alkali metal salts. For instance, the calcium, barium, or strontium salts of penicillin may be converted to the sodium, potassium or lithium salts in a manner similar to that described above for the calcium to the sodium salt.

The starting materials can be either the crude forms of the salts usually obtained from the fermentation or purified preparations thereof.

The synthetic resins employable according to the invention are those effective to cause ion exchange or ion removal, as the case may be. A class of these resins is disclosed in U. S. Patent No. 2,104,501, Jan. 4, 1938. They are defined as "synthetic resins obtained by the condensation with formaldehyde or an equivalent methylene body or mixtures of formaldehyde and an equivalent methylene body, of mixtures of bodies falling within one or more of the following classes, namely, polyhydric phenols, derivatives of polyhydric phenols and tannins together with or in the absence of monohydric phenols." The expression "polyhydric phenolic bodies" is used as signifying polyhydric phenols as well as their derivatives and tannins. The expression "tannins" is used to denote not only the natural products but also the synthetic materials, especially those prepared from phenols and their derivatives. The expression "a compound containing a labile methylene group" is employed to indicate formaldehyde itself or any of the bodies which may be regarded as the equivalents of formaldehyde in their reactivity with phenolic bodies in the production of resin-like products. Generically, therefore, such a material may be defined as "a condensation product of a mixture comprising a polyhydric phenol and a compound containing a labile methylene group."

It will be understood that, without departing from the spirit of the invention or the scope of the claims, various other modifications may be made in the specific expedients described. The latter are illustrative only and not offered in a restricting sense, it being desired that only such limitations shall be placed thereon as may be required by the state of the prior art.

The sub-titles used through the specification are merely to simplify reference thereto and should otherwise be disregarded.

I claim:

1. A process of converting one salt of penicillin to another, comprising the step of subjecting a solution of a salt selected from the group consisting of alkali metal salts and alkaline earth metal salts of penicillin to the action of a cation exchange resin containing a replaceable element different from the ionizable metal in said salt of penicillin and selected from the group consisting of alkali metals, alkaline earth metals and hydrogen, said resin being a polyhydric-phenol-formaldehyde resin.

2. The steps defined in claim 1, in which the salt subjected to treatment by the resin is the calcium salt of penicillin.

3. A process of converting the calcium to the sodium salt of penicillin, comprising, subjecting a solution of the calcium salt of penicillin to the action of a cation exchange resin containing replaceable sodium, said resin being a polyhydric-phenol-formaldehyde resin, whereby the calcium salt is converted to the sodium salt without substantial loss of potency.

4. A process of converting the calcium to the sodium salt of penicillin, comprising, subjecting a solution of the calcium salt of penicillin to the action of a cation exchange resin containing replaceable hydrogen, said resin being a polyhydric-phenol-formaldehyde resin, thereby to remove the calcium ions while leaving the penicillin substantially quantitatively in the solution, and treating the solution to convert the penicillin to the sodium salt.

5. A process of converting the calcium salt of penicillin to the sodium salt, comprising, acting on a solution of the calcium salt of penicillin with a cation exchange resin containing replaceable sodium, said resin being a polyhydric-phenol-formaldehyde resin, the temperature being maintained substantially at that of an ice bath and the pH being maintained within the range from about 6.5 to about 7.1, whereby the calcium salt of penicillin is converted to the sodium salt.

6. In a process of converting an alkaline earth metal salt of penicillin to an alkali metal salt of penicillin, the step of subjecting a solution of said alkaline earth metal salt to the action of a synthetic cation exchange resin containing a replaceable alkali metal ion, said resin being a polyhydric-phenol-formaldehyde resin, whereby said alkaline earth metal salt is converted to an alkali metal salt without substantial loss of potency.

7. In a process of converting one salt of penicillin to another, the step of subjecting a solution of a salt selected from the group consisting of alkali metal salts and alkaline earth metal salts of penicillin to the action of a synthetic cation exchange resin containing replaceable hydrogen, said resin being a polyhydric-phenol-formaldehyde resin, thereby to remove the said metal ions while leaving the penicillin substantially quantitatively in the solution, and thereafter replacing said metal ions with ions of another metal.

8. In a process of converting one ionic compound of penicillin to a different ionic compound of penicillin, the step of subjecting a solution of a penicillin compound selected from the group consisting of alkali metal salts of penicillin and alkaline earth metal salts of penicillin to the action of a synthetic cation exchange resin containing a replaceable ionizable element different from the ionizable element in the penicillin compound treated and selected from the group consisting of alkali metals, alkaline earth metals and hydrogen, while refrigerating the solution, said resin being a polyhydric-phenol-formaldehyde resin, whereby the ionizable element originally present in the penicillin compound is replaced by the ionizable element originally present in the cation exchange resin.

GORDON A. GRANT.

REFERENCES CITED

The following references are of record in the file of this patent:

UNITED STATES PATENTS

| Number | Name | Date |
| --- | --- | --- |
| 2,153,169 | Brooker | Apr. 4, 1939 |
| 2,165,338 | Brooker et al. | July 11, 1939 |

OTHER REFERENCES

"The Amberlites," pp. 1-8, 24, Dec. 5, 1942. (Copy in Div. 50.)

Report No. 12, May 3, 1943 (by R. D. Goghill, issued by Committee on Med. Research of O. S. R. D.). (Copies available in Division 59.)

Chem. and Eng. News, Sept. 10, 1943. (Photostat in Div. 63.)